United States Patent [19]

Decoster

[11] Patent Number: 5,172,360
[45] Date of Patent: Dec. 15, 1992

[54] LOADING DEVICE AND DISC RECORD PLAYER COMPRISING THE LOADING DEVICE

[75] Inventor: Michel H. F. Decoster, Hasselt, Belgium

[73] Assignee: U.S. Philips Corporation, New York, N.Y.

[21] Appl. No.: 301,002

[22] Filed: Jan. 23, 1989

[30] Foreign Application Priority Data

Feb. 23, 1988 [NL] Netherlands ............. 8800448

[51] Int. Cl.⁵ ............................................. G11B 33/02
[52] U.S. Cl. ................................................. 369/75.2
[58] Field of Search ............... 369/75.2, 75.1, 77.1, 369/77.2; 360/270, 99.06, 99.02

[56] References Cited

U.S. PATENT DOCUMENTS

| | | | |
|---|---|---|---|
| 4,479,210 | 10/1984 | Nakayama | 369/270 X |
| 4,564,930 | 1/1986 | Funabashi et al. | 369/75.2 |
| 4,607,361 | 8/1986 | Schmitmaker et al. | 369/75.2 |
| 4,759,008 | 7/1988 | Hirano et al. | 369/75.2 |
| 4,764,917 | 8/1988 | Sugihara et al. | 369/75.1 X |
| 4,779,257 | 10/1988 | Matsumoto | 369/75.2 |
| 4,815,065 | 3/1989 | Rouws | 369/75.2 X |
| 4,833,666 | 5/1989 | Gijzen et al. | 369/75.2 |
| 4,835,760 | 5/1989 | Aldenhoven et al. | 369/75.2 |

Primary Examiner—John W. Shepperd
Assistant Examiner—Michael C. Kessell
Attorney, Agent, or Firm—David R. Treacy

[57] ABSTRACT

A loading device comprises a frame (103), a drawer (100) which is movable between a first and the second position, guide means for guiding the drawer, and an electric motor (115) for driving the drawer. The guide means comprise a supporting body (117) which is movable in the frame and which comprises supporting elements (123), guide elements (139) secured to the frame, and at least one stop element (137) secured to the frame. The supporting elements serve for supporting the drawer and the supporting body in such a way that they are movable relative to one another during the movement of the drawer between the first and the second position, and the guide elements serve for moving the drawer relative to the frame in a direction parallel to a supporting surface (101) of the drawer. The stop element serves for guiding the drawer in a direction transverse to said supporting surface.

25 Claims, 4 Drawing Sheets

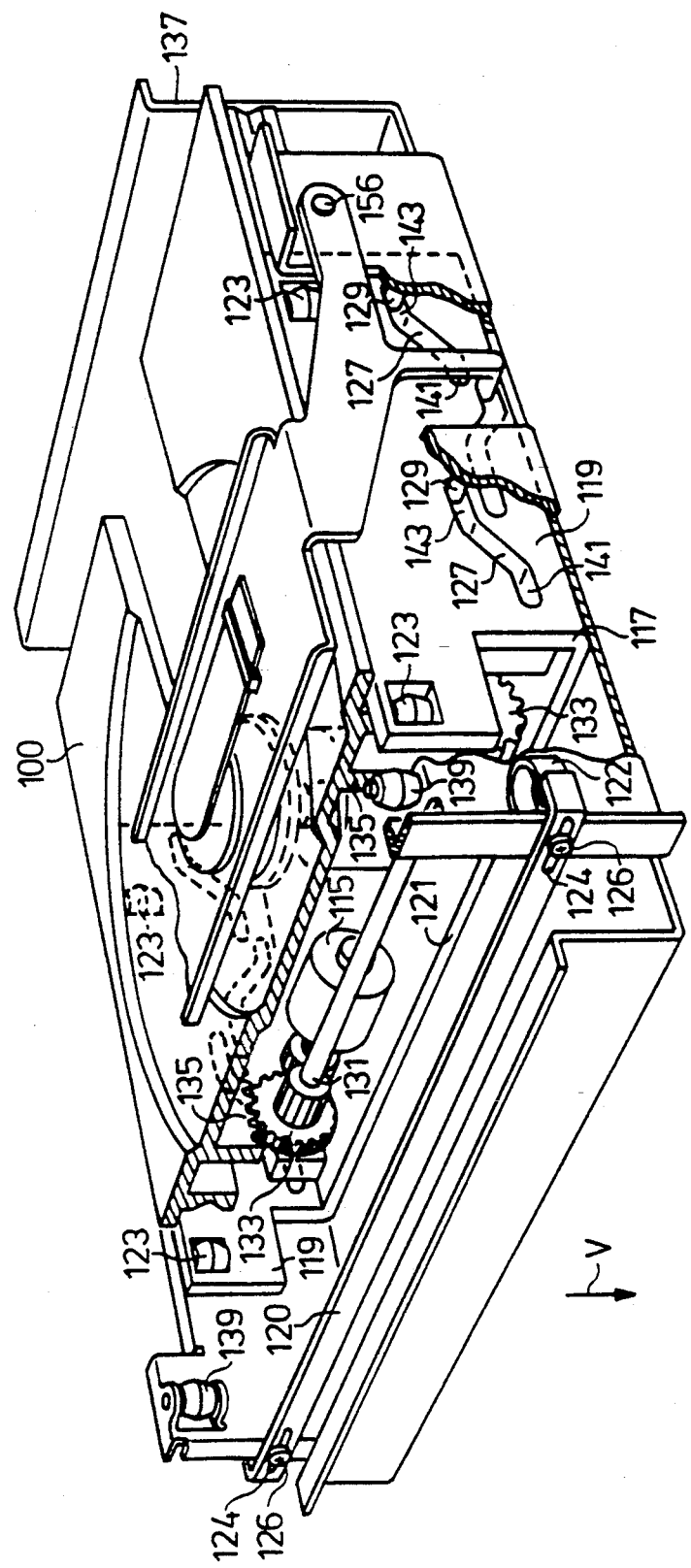

LOADING DEVICE AND DISC RECORD PLAYER COMPRISING THE LOADING DEVICE

BACKGROUND OF THE INVENTION

The invention relates to a loading device intended for cooperation with an apparatus for recording and/or reproducing signals on/from a record carrier. The device includes a frame and a drawer which is movable in a first movement from a first position in which the record carrier can be placed on a supporting surface of the drawer, to a second position to transfer the record carrier to the apparatus for recording and/or reproducing signals, and in a second movement from the second position to the first position to return the record carrier. The device further includes guide means for guiding the drawer, and an electric motor for moving the drawer between the first and the second position.

The invention further relates to a disc-record player comprising a housing, an apparatus for recording and- /or reproducing signals on/from a disc-shaped record carrier which apparatus is arranged in said housing, and a loading device for the record carrier, which apparatus for recording and/or reproducing signals comprises a turntable which is rotatable about an axis of rotation and which comprises a centering mandril and a supporting surface for a record carrier formed with a centre hole, and which loading device comprises a drawer which is movable between a slid-out position and a slid-in position, in which slid-out position the record carrier can be placed on the supporting surface, which drawer can perform an inward movement to transfer the record carrier to the turntable, and can perform an outward movement to return the drawer with the record carrier to the slid-out position.

Disc-record players and loading devices of the types defined in the foregoing are known from European Patent Application 0,149,532. The known disc-record players comprise a housing in which a frame is arranged which carries a loading device and a turntable. The known loading devices comprise a drawer which is movable between an open and a closed position through a front opening in the housing, which drawer comprises a frame and a platform which is movable relative to the frame and which is intended for supporting an optical disc, such as a Compact Disc. The loading devices further comprise means by which the platform is movable relative to the drawer frame and thus in an axial direction relative to the turntable.

In one of the disc record players revealed in European Patent Application 0,149,532 the platform moving means comprise a plurality of pins projecting laterally from the platform and a corresponding number of inclined grooves formed in the drawer frame and engaged by the pins. When the drawer passes the turntable when it is slid inwards the platform is disposed in such a plane that a disc situated on the platform cannot contact the turntable. Towards the end of the inward movement of the drawer the pins of the platform move downwardly in the grooves, causing the frame of the drawer to remain in the same plane and the platform to be moved towards a lower level. In another disc record player the platform moving means comprise four pivotable arms which each have one end pivotally connected to the drawer frame and an other end pivotally connected to the platform. By means of a fixed stop and a tension spring which acts between the platform and the drawer frame, the platform can move relative to the drawer frame between a first and a second level during the rectilinear inward and outward movement of the drawer, the arms being pivoted through a limited angle.

The known disc-record players constitute a rather intricate mechanical assembly because of the necessity to provide a two-part drawer including the frame and a platform which is movable relative thereto. In order to ensure a correct sequence of the movements and a correct positioning of the platform stringent requirements have to be imposed on the mechanisms used, which obviously leads to a higher cost of the loading device and, consequently, of a disc-record player comprising such loading device.

To this end the loading device in accordance with the guide means of the loading device include a supporting body movably supported in the frame and supporting elements for supporting the drawer and the supporting body so as to be movable relative to one another. At least one guide element is secured to the frame and during a first stage of the first movement and a second stage of the second movement cooperates with the drawer to move the drawer in a direction parallel to the supporting surface. At least one stop element is secured to the frame and during a second stage of the first movement and the first stage of the second movement cooperates with a drawer to move the drawer in a direction transverse to the supporting surface.

The loading device in accordance with the invention has the advantage that it can be manufactured from a comparatively small number of simple parts, whilst the simple mechanical construction ensures a correct sequence of the functions performed between the instant at which the record carrier is placed on the drawer and the cooperation of the record carrier with the apparatus for recording and/or reproducing signals. If the electric motor is coupled to a transmission mechanism comprising at least one drive wheel which cooperates with the drawer, a favourable for construction is obtained by securing the electric motor and the transmission mechanism to the supporting body.

The invention also aims at providing a disc record player with the loading device in accordance with the invention. Since the drawer can be of compact construction, only a comparatively small front opening is needed in the housing of the disc record player for the passage of the drawer, which maybe an advantage because it provides additional room for control elements and other elements of the disc record player, such as displays.

A simple to realise and stable support for the supporting body is obtained if the supporting body comprises two side walls which, viewed in a direction related to the first stage of the first movement, are formed with at least two upwardly inclined grooves which are engaged by fixed projections of the frame. For constructional reasons the projections may engage lower end portions of the grooves in the first position of the drawer and engage upper end portions of the grooves in the second position of the drawer. For stability reasons or for reasons of cost it may be desirable to provide the supporting body with a connecting wall interconnecting the two side walls of the supporting body.

A simple-to-realise and stable support for the supporting body is also obtained if the frame comprises two side walls which, viewed in a direction related to the first stage of the first movement, are formed with at least two upwardly inclined grooves which are engaged by projections of the supporting body. The projections may the upper end portions of the grooves in the first position of the drawer and engage the lower end portions of the grooves in the second position of the drawer.

For certain uses it may be desirable to employ the supporting body as a control element for controlling one or more movements of specific parts of the apparatus or arrangement in which the loading device is used. In that case it is favourable if the upper and/or lower end portions of the grooves extend parallel to the supporting surface of the drawer. An example of this is the use of the loading device in accordance with the invention in a disc-record player in accordance with the invention, which player comprises a disc-pressure member whose movement can be derived from the movement of the supporting body.

A simple to realise guidance for the drawer is obtained if the supporting elements arranged on the supporting body comprise rollers which engage slots formed in opposite sides of the drawer. In view of this guidance it is also favourable to provide at least one further guide element in addition to the guide element secured to the frame and to construct the guide elements as rollers which in the first position of the drawer and during the first stage of the first movement and the second stage of the second movement engage slots formed in opposite sides of the drawer. The first-mentioned slots and the last mentioned slots may be the same. In addition to the stop element secured to the frame, a further stop element may be provided, which stop elements are constituted by a first and a second upright wall portion of the frame, the drawer abutting against the first wall portion during the second stage of the first movement and the drawer abutting against the second wall portion during the first stage of the second movement. This step enables the supporting surface of the drawer to be moved normally to the supporting surface during the stages of the drawer movements.

It may be desirable to start the electric motor in the first position of the drawer by exerting a moderate pressure on the drawer. For this purpose a first actuating element may be arranged on the drawer and when the drawer is moved out of the first position, actuates a first switching element, secured to the frame in order to start the electric motor.

An easy-to-operate disc-record player employing a loading device in accordance with the invention has a starting a element arranged on a drawer portion which projects from the housing in the slid-out position of the drawer. The starting element may be actuated via at least a portion of the front wall of the drawer. The starting element may be a mechanical switch, a capacitively operating switching element, or an inductively operating element.

The disc-record player may have a disc-pressure member secured to a pressure element which is movable between a press-down position and a position which more remote from the turntable, is the supporting body being formed with at least one control groove in which a projection of the pressure element is slidable. Without the use of additional drive means this step guarantees a correct operation of the disc pressure member. The control groove may have a groove portion which extends parallel to the supporting surface and a groove portion which is downwardly inclined viewed in a direction related to the inward movement, the pressure element being moved to the press-down position during the inward movement of the drawer and to said other position during the outward movement of the drawer.

BRIEF DESCRIPTION OF THE DRAWINGS

FIG. 4 shows the part of the second embodiment shown in FIG. 3, the drawer being shown in a slid-in position and with an optical disc situated on the turntable.

DETAILED DESCRIPTION OF THE PREFERRED EMBODIMENTS

Figure 1:
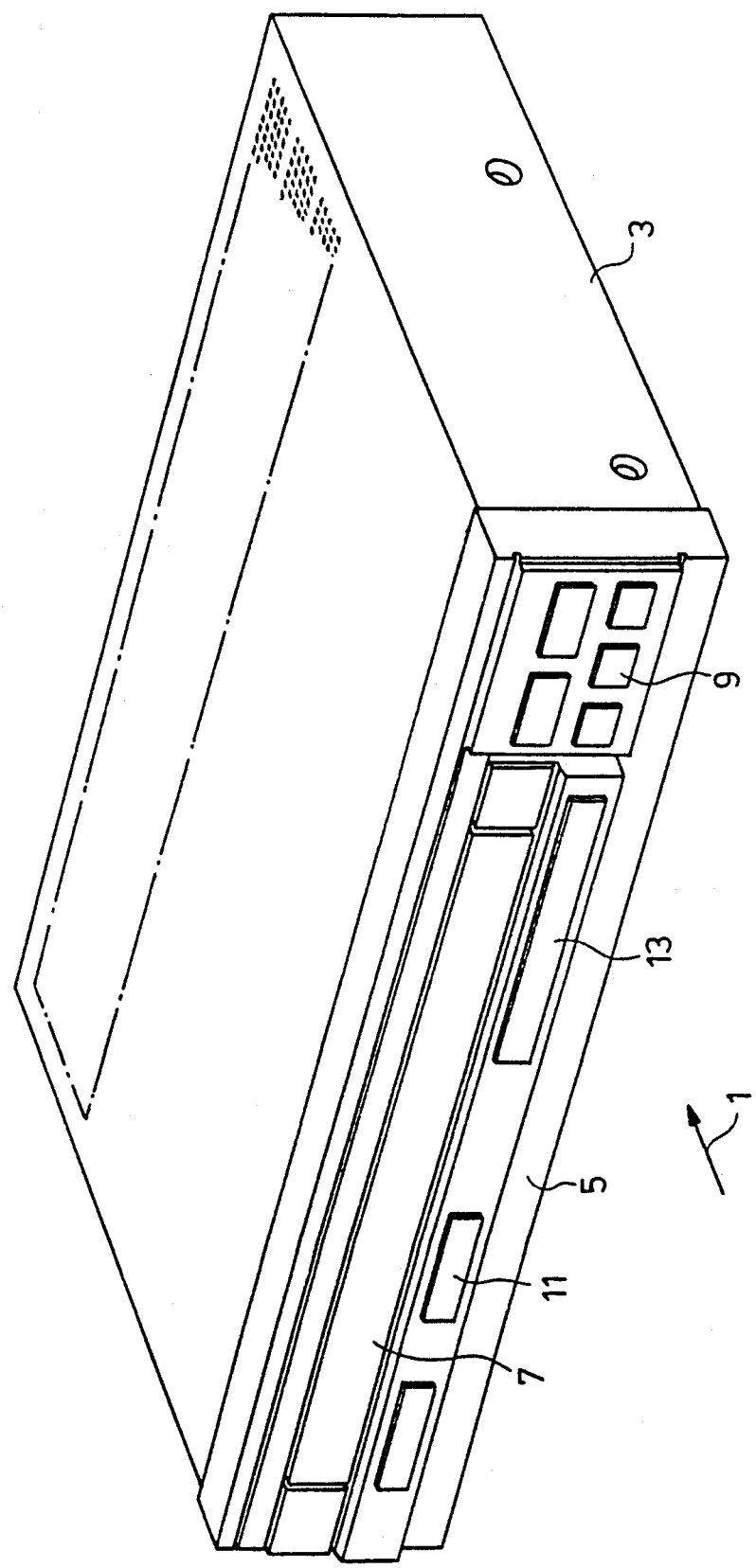
FIG. 1 is a perspective view of a first embodiment of the optical disc record player.

The optical disc-record player shown in FIG. 1 is suitable for optically scanning audio and video discs, of which different types are known as CD, CDV and LV discs. The disc-record player 1 comprises a housing 3 having a front 5 having a front opening in which a drawer 7 is situated. The front 5 further carriers actuating keys 9, program keys 11 and a display 13. The housing 3 accommodates a loading device of which drawer 7 forms part and a device for optically scanning an optical disc.

The loading device in accordance with the invention, shown diagrammatically in FIGS. 2A to FIG. 2D, comprises a frame 15 and a drawer 17 which is movable between a first position (see FIG. 2A) and a second position (see FIG. 2D), which drawer corresponds to the drawer 7. The loading device further comprises an electric motor 19 which is adapted to cooperate with the drawer 17 to move the drawer 17 between the first and the second position, and guide means for guiding the drawer 17. The drive means comprise a supporting body 21 which is movably supported in the frame 15 and to which the electric motor 19 is secured, said supporting body also carrying supporting elements 23 for supporting the drawer and the supporting body 21 in such a way that they are movable relative to one another. The supporting elements 23 may be constructed, for example, as cylindrical or conical rollers and are arranged at opposite sides of the drawer 17. At opposite sides of the drawer 17 a guide element 25 is secured to the frame. The guide elements 25 serve for horizontally guiding the drawer 17 during stages of movement of the drawer 17 performed when this drawer is moved between the first and the second position. Said stages of movement are the movements performed by the drawer 17 between the situations shown in FIG. 2A and FIG. 2B.

Figure 2A:
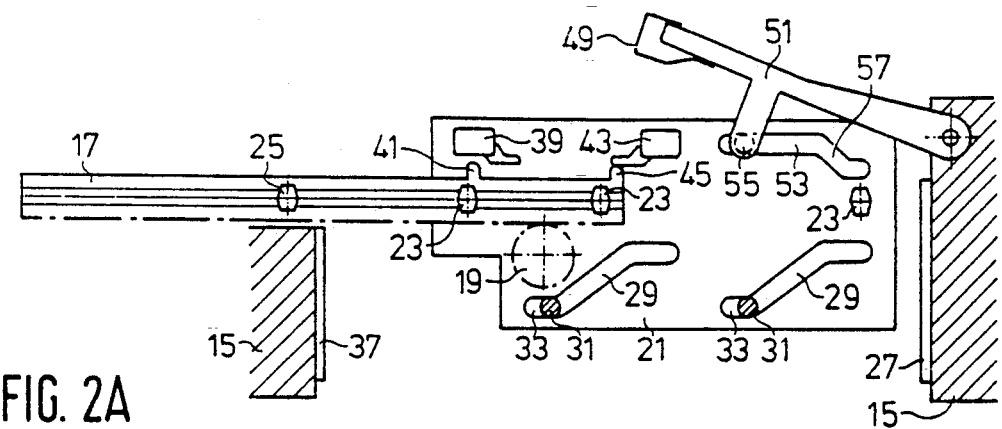
FIG. 2A shows diagrammatically a loading device used in the disc record player shown in FIG. 1, the drawer being shown in a first position.
Figure 2B:
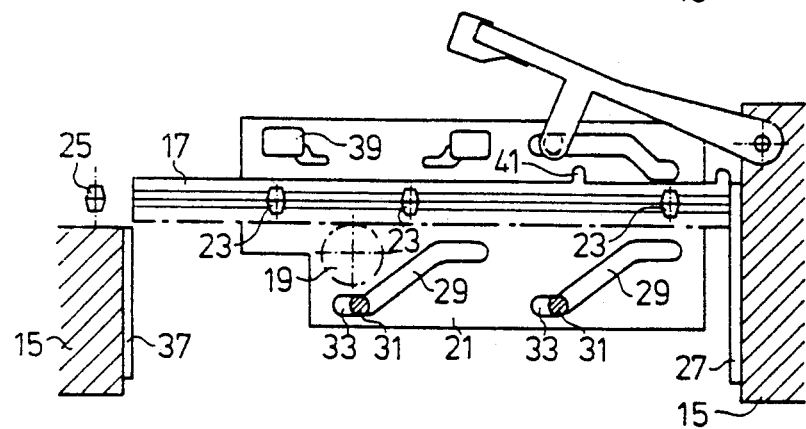
FIG. 2B shows the loading device of FIG. 2A in an intermediate position of the drawer.
Figure 2C:
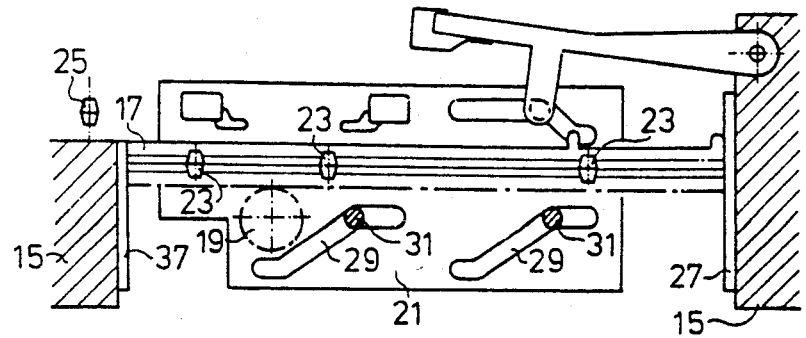
FIG. 2C shows the device of FIG. 2A in an other intermediate position of the drawer.
Figure 2D:
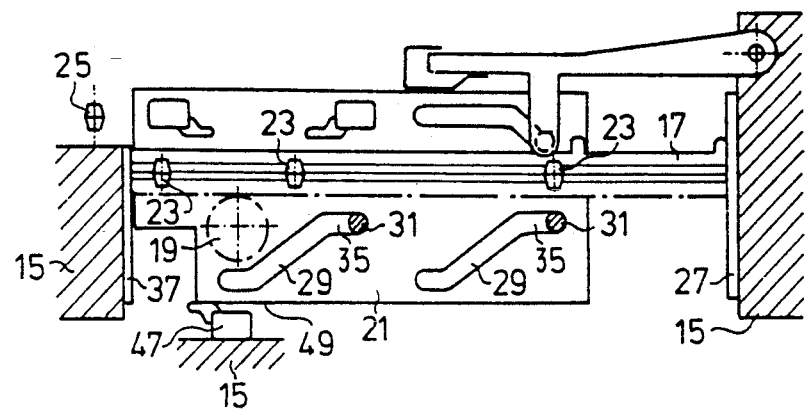
FIG. 2D shows the device of FIG. 2A in a second position of the drawer.

When the drawer 17 is moved from the first position, as shown in FIG. 2A, to the second position, as shown in FIG. 2D, the drawer 17 will abut against a stop element 27 of the frame 15 at a given instant. As the movement of the drawer 17 proceeds the stop element 27 ensures that the drawer 17 is moved vertically towards the second position.

The supporting body 21 is formed with downwardly inclined grooves 29 which are engagedby fixed projections 31 of the frame. During the movement of the drawer 17 from the initial position to the position as shown in FIG. 2B, the fixed projections 31 suitably engage in horizontal end portions 33 of the grooves 29. During the movement of the drawer from the position as shown in FIG. 2B to the position as shown in FIG. 2C the supporting body 21 is moved downwardly, the fixed projections 31 being moved relative to the supporting body 21 via the grooves 29. In the second position, as is shown in FIG. 2D, the fixed projections 31 preferably engage in horizontal upper end portions 35 of the grooves 29 in the supporting body 21. From FIGS. 2A to 2D it will be apparent that in the case of a downwardly moving drawer the supporting body 21 performs both a vertical and a horizontal movement until the drawer has reached its second position. During the movement of the drawer 17 from its second position towards its first position, the drawer 17 being driven in an opposite direction by the electric motor 19, the drawer 17 is initially urged against a stop elements 37 of the frame 15 until the position as shown in FIG. 2B is reached. Subsequently, the drawer 17 moves rectilinearly to the first position.

In order to facilitate starting and stopping of the electric motor 19 the loading device in accordance with the invention may be provided with a plurality of switches or switching elements. In the diagrammatical representation a first switch 39 is situated on the supporting body 21 and when the drawer is moved out of the first position this first switch is actuated by a first actuating element 41 to start the electric motor 19 in a first direction of rotation. A second switch 43, which is also arranged on the supporting body 21, serves to stop the electric motor 19 when the drawer 17 has been moved from the second position to the first position. For this purpose the drawer 17 carries a second actuating element 45. The frame 15 carries a third switch 47 which is actuated by a stop 48 of the supporting body 21 in order to stop the electric motor 19 in the second position of the drawer. Moreover, the loading device may comprise a fourth switch which can be actuated by hand to start the electric motor 19 in the second position of the drawer 17.

It is to be noted that within the scope of the invention it is also possible to give the frame 15 such a shape that it can be provided with upwardly inclined grooves to replace the grooves 29 in the supporting body 21. Instead of the frame 15 the supporting body 21 msut then be provided with the projection which engage the grooves.

If the loading device in accordance with the invention is used in a disc record player a pressure member 49 may be used for pressing the record carrier onto a turntable. In the construction as shown diagrammatically in FIGS. 2A to 2D the pressure member 49 is coupled to the supporting body 21 via a pressure element 51 which is pivotally supported in the frame 15. For this puprose the supporting body 21 is formed with a control groove 53 which is engaged by a projection 55 of the pressure element 51. The control groove 53 has a downwardly inclined groove portion 57 to enable the pressure member 49 to be pressed with adequate force against the record carrier on the turntable in the second position of the drawer 17.

A practical embodiment of the disc record player in accordance with the invention will now be described with reference to FIGS. 3 and 4. The disc record player comprises a drawer 100 which has a supporting surface 101 with such a profile that discs of different diameter can be placed on the drawer. The disc record player further comprises a frame 103, in which an electric motor 105 is mounted to drive a turntabvle 109 which is rotatable about an axis of rotation 107. The turntable 109 is provided with a centering mandrill 111 and has a supporting surface 113 for an optical disc formed with a centre hole. The disc-record player further comprises an electro-optical scanning device, not shown, of a type as described, for example, in European Patent Application 0,196,691 (to which U.S. Pat. No. 4,694,442 corresponds, herewith incorporated by reference). The drawer 100 is movable between the slid-out position shown in FIG. 3 and the slid-in position shown in FIG. 4 and can be driven by an electric motor 115. The electric motor 115 is secured to a supporting body 117, which comprises two side walls 119 and a connecting wall 121. At both side walls 119 the supporting body 117 is provided with two supporting elements constructed as conical rollers 123 which cooperate with two longitudinal slotss 125 in the drawer 100, which permits a displacement of the drawer 100 relative to the supporting body 117 in a direction parallel to the supporting surface 101 of the drawer 100. To support the drawer 100 relative to the supporting body 117 without lost motion a bracket 120 is urged against the side wlals 119 by means of two resilient elementss 122, of which only one element is visible in the Figures. The bracket has two slotted holes 124 and by means of screws it is adjustably secured to the supporting body 117. By menas of two pairs of grooves 127 in the side walls 119 and two pairs of pins engaging the groovess 127 the supporting body 117 is movably supported relative to the frame. The electric motor 115 secured to the supporting body 117 operates via a transmission mechanism 131 which is secured to the connecting wall 121 and which comprises two gear wheels 133 which mesh with two gear racks 135 of the drawer 100.

Figure 3:
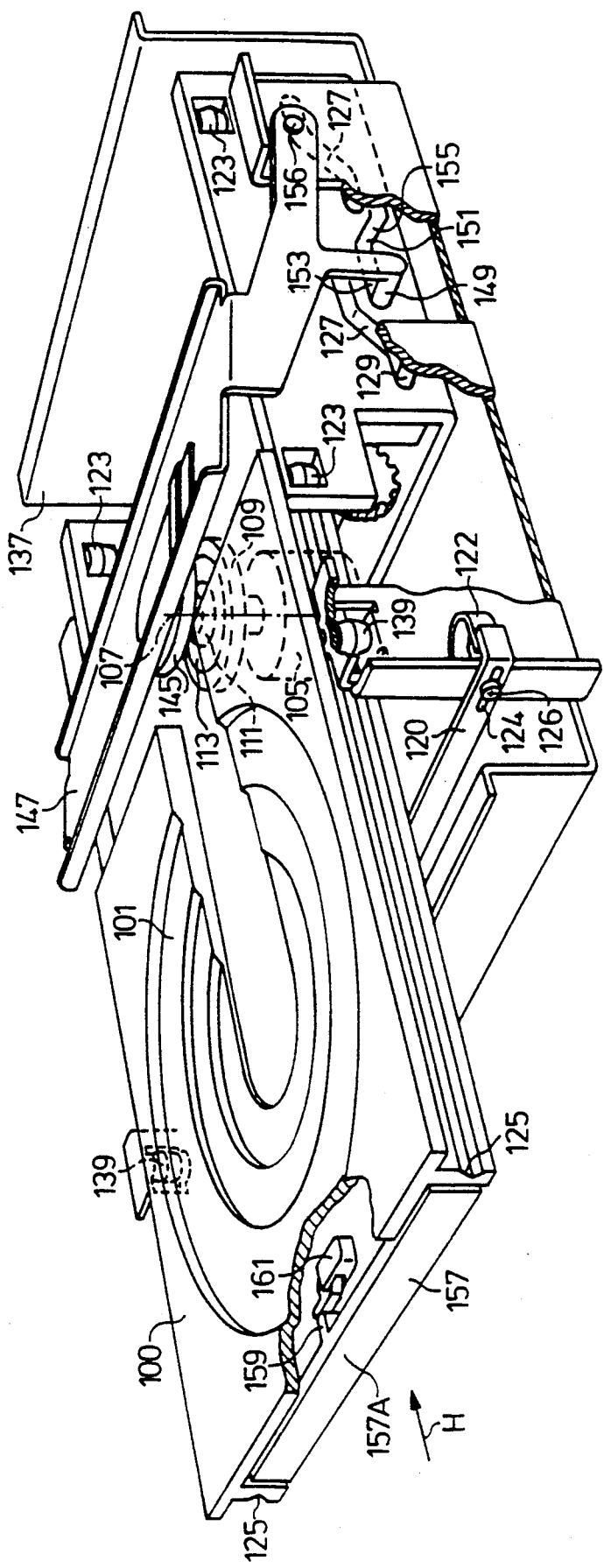
FIG. 3 is a cut-away view showing a part of a second embodiment of the disc-record player, the drawer being shown in a slid-out position.

After the electric motor 115 has been started the drawer 100 is moved out of the slid-out position as shown in FIG. 3 with a rectilinear movement parallel to the supporting surface 101 in the direction indicated by the arrow H, until the drawer 100 abuts against a stop element 137 at the rear of the housing of the player. The stop element 137 is constituted, for example, by an upright wall portion of the frame 103. During said horizontal rectilinear movement the drawer 100 is guided by said rollers 123 of the supporting body 117 and by two conical rollers 139 which are supported in the frame 103 and which cooperate with said slotss 125. After the drawer 100 has reached the stop element 137 the movement of the drawer 100 in the direction indicated by the arrow H changes to a movement which is directed perpendicularly thereto as indicated by the arrow V, the draer 100 being moved past stop element 137 and the supporting body 117 being driven in the same direction V concurrently with a movement in a direction opposite to that indicated by the arrow H. The electric motor 115 is stopped as soon as the draer 100 has reached the second position as shown in FIG. 4. During the vertical movement of the drawer 100 the supporting body 117 has performed such a movement relative to the draer 100 that the pins 129 of the frame 103 have moved in the grooves 127 from the lower end portions 141 of the grooves 127 to the upper end portions 143 of the grooves 127. As a result of this, the device in accordance with the invention is capable of horizontally moving an optical disc placed on the supporting surface 101 of the drawer 100 into the housing of the disc-record player over the turntable 109 and subsequently positioning said disc exactly on the supporting surface 113 of the turntable 109 with a vertical movement.

As during scanning of the optical disc it is necessary to press said disc against the supporting surface 113 of the turntable 109 the disc-record player in accordance with the invention is provided with a disc-pressure member 145. The disc-pressure member 145 is resiliently and rotatably mounted in a pressure element 147 which is pivotally connected to the frame 103. The pressure element 147 has a projection 149 on opposite sides, only one such projection being shown in the drawing. The projections 149 engage in two control grooves 151 formed in the side walls 119 of the supporting body 117 and comprising a horizontal groove portion 143 and an inclined groove portion 155. The projections 149 are positioned in such a way relative to the groove portions 153 and 155 that as a result of the movement of the supporting body 117 the projections 149 do not reach the inclined groove portions 155 until shortly before the drawer reaches the second position, so that only during the last stage of the complete inward movement of the drawer 100 the pressure element 147 is moved about pivoting spindle 156 and the disc pressure member 145 is pressed on to the disc, which is now positioned on the turntable 109. It will be evident that the inclination of the groove portions 155 also determiness the magnitude of the pressure with which the pressure element 147 acts against the turntable 109.

In order to remove an optical disc placed on the turntable 109 the electric motor 115 must drive the drawer 100 in the opposite direction. The movements then performed by the drawer 100, the supporting body 117 and the pressure element 147 are directed oppositely to the movements described in the foregoing.

The embodiment described with reference to FIGS. 3 and 4 can be assembled from a comparatively small number of easy-to-manufacture parts, the entire construction being convenient-to-assemble. The embodiment allows a compact construction of, in particular, very small height. Experiments have shown that the selected coupling between the pressure element 147 and the supporting body 117 guarantees an accurately defined movement of the disc pressure member 145 and an adequate pressure.

It is to be noted that the drawer 100 in the embodiment shown in FIGS. 3 and 4 comprises a front wall 157, of which a portion 157A is constructed as a pushbutton. The portion 157A has an actuating projection 159 for actuating a switch 161 which is secured to the drawer and which is arranged in an electric circuit for starting the electric motor 115 to move the drawer 100 from the slid-out position to the slid-in position.

Obviously, the invention is not limited to the embodiments shown herein. For example, it is possible to construct the supporting body without a connecting wall between the side walls. It is possible also to replace said push-button by a touch control. Moreover and shape of said grooves and pins in an appropriate manner within the scope of the invention.

What is claimed is:

1. A loading device for an apparatus for recording and/or reproducing signals on/from a record carrier, comprising:

a frame,
a drawer having a supporting surface for receiving a record carrier placed thereon, and meanss for guiding said drawer to allow movement between a first position, in which the record carrier can be placed on said supporting surface, and a second position allowing access by the apparatus for recording and/or reproducing signals, and
means for moving the drawer between the first and second positions,
characterized in that said means for guiding comprises:
a guide element secured to said frame and engaging said drawer for guiding the drawer for movement in a direction parallel to said supporting surface during a first stage of first movement from the first position toward the second position and during a second stage of second movement from the second position to the first position.
a supporting body supported movably in said frame, comprising supporting elements for supporting the drawer at least during a second stage of said first movement and a first stage of said second movement, said supporting body and drawer being movable relative to one another during said second stage of said first movement and said first stage of said second movement, and
a stop element secured to the frame for engaging the drawer during said second stage of the first movement and during the first stage of the second movement so that the drawer moves in a direction generally perpendicular to said supporting surface.

2. A loading device as claimed in claim 1, characterized in that the supporting body comprises two side walls which, viewed in a direction related to said first stage of the first movement, are formed with at least two upwardly inclined grooves which are engaged by fixed projections of the frame.

3. A loading device as claimed in claim 2, characterized in that said projections engage lower end portions of the grooves in the first position of the drawer and engage upper end portions of the grooves in the second position of the drawer.

4. A loading device as claimed in claim 3, characterized in that at least said upper end portions extend parallel to the supporting surface of the drawer.

5. A loading device as claimed in claim 2, characterized in that the supporting body comprises a connecting wall which interconnects said two side walls.

6. A loading device as claimed in claim 1, characterized in that the frame comprises two side walls which viewed in a direction related to said first stage of the first movement, are formed with at least two upwardly inclined grooves which are engaged by fixed projections of the supporting body.

7. A loading device as claimed in claim 6, characterized in that said projections engage upper end portions of the grooves in the first position of the drawer and engage lower end portions of the grooves in the second position of the drawer.

8. A loading device as claimed in claim 7, characterized in that at least said lower end portions extend parallel to the supporting surface of the drawer.

9. A loading device as claimed in claim 1, in which said means for moving comprises an electric motor coupled to a transmission mechanism comprising at least one drive wheel which cooperates with the drawer, characterized in that the electric motor and the transmission mechanism are secured to the supporting body.

10. A loading device as claimed in claim 1, characterized in that said supporting elements comprise rollers which engage slots formed in opposite sides of the drawer.

11. A loading device as claimed in claim 1, characterized in that in addition to said guide element at least one further guide element is provided, the guide elements being constituted by rollers which in a first position of the drawer and during said first stage of the first movement and said second stage of the second movement engage slots formed in opposite sides of the drawer.

12. A loading device as claimed in claim 1, characterized in that in addition to said stop element a further stop element is provided, which stop element are constituted by a first and a second upright wall portion of the frame, the drawer abutting against the first wall portion during said second stage of the first movement and the drawer abutting against the second wall portion during said first stage of the second movement of the drawer.

13. A loading device as claimed in claim 1, the loading device comprising a plurality of switching elements, characterized in that a first actuating element is arranged on the drawer and, when the drawer is moved out of the first position, actuates a first switching element to start the electric motor.

14. A loading device as claimed in claim 1, the loading device is comprising with a plurality of switching elements, characterized in that a second actuating element is arranged on the drawer and at the end of said second movement actuates a second switching element, secured to the frame, to stop the electric motor.

15. A loading device as claimed in claim 1, the loading device comprising a plurality of switching elements, characterized in that a stop is arranged on the supporting body and actuates a third switching element at the end of said first movement in order to stop the electric motor.

16. A loading device for an apparatus for recording and/or reproducing signals on/from a record carrier, comprising:
a frame,
a drawer having a supporting surface for receiving a record carrier placed thereon, and means for guiding said drawer for movement in a direction parallel to said supporting surface during a first stage of first movement from a first position, in which the record carrier can be placed on said supporting surface, to a second position allowing access by the apparatus for recording and/or reproducing signals, and during a second stage of second movement from the second position to the first position, and
means for moving the drawer between the first and second positions,
characterized in that said means for guiding comprises:
a supporting body supported movably in said frame, having supporting elements for supporting the drawer during a second stage of said first movement and a first stage of said second movement, and during at least a portion of said first stage of said first movement and said second stage of said second movement, said supporting body and drawer being movable relative to one another in a first direction parallel to drawer movement during said first stage of first movement, and during said second stage of said first movement said supporting body and drawer continuing relative movement with respect to each other in said first direction, and
said means for moving the drawer comprises transverse movement means, responsive to the continuing relative movement during said second stage of said first movement, for moving the drawer in a direction generally perpendicular transverse to said supporting surface.

17. A device as claimed in claim 16, characterized in that said means for guiding comprises means for limiting relative movement between the drawer and supporting body to movement in a direction parallel to said supporting surface, whereby said drawer and supporting body move together in said direction generally perpendicular to said supporting surface.

18. A device as claimed in claim 17, characterized in that the transverse movement means comprises:
a guide element secured to the frame and engaging said supporting body so as to move the supporting body in said direction generally perpendicular to said supporting surface in response to relative movement of the supporting body with respect to the frame in directions parallel to said supporting surface, and
a stop element secured to the frame for engaging the drawer during said second stage of the first movement and during the first stage of the second movement for preventing movement of the drawer in said direction parallel to said supporting surface.

19. A device as claimed in claim 18, characterized in that the means for moving the drawer comprises an electric motor mounted to the supporting body.

20. A device as claimed in claim 16, characterized in that the means for moving the drawer comprises an electric motor mounted to the supporting body.

21. A disc record player comprising a housing, apparatus arranged in said housing for recording and/or reproducing signals on/from a disc-record, and a loading device for the disc-record,
said apparatus comprising a turntable mounted in said housing for rotation about an axis of rotation, having a centering mandril and a surface for receiving a disc record formed with a center hole, and
said loading device comprising:
a frame,
a drawer having a supporting surface for receiving a disc record placed thereon, and means for guiding said drawer for movement in a direction parallel to said supporting surface during a first stage of first movement from a first position, in which the disc record can be placed on said supporting surface, to a second position in which the disc record is deposited on the turntable surface for receiving, and during a second stage of second movement from the second position to the first position, and
means for moving the drawer between the first and second positions,
characterized in that said means for guiding comprises:
a supporting body supported movably in said frame, having supporting elements for supporting the drawer during a second stage of said first movement and a first stage of said second movement, and during at least a portion of said first stage of said first movement and said second stage of said second movement, said supporting body and drawer being movable relative to one another in a first direction parallel to drawer movement during said first stage of first movement, and during said second stage of said first movement said supporting body and drawer continuing relative movement in said first direction, said means for moving comprises means for directly causing relative movement between the drawer and the supporting body, and said means for guiding further comprises means, responsive to the continuing relative movement during said second stage of said first movement, for moving the drawer in a direction generally perpendicular to said supporting surface.

22. A player as claimed in claim 21, comprising a starting element, characterized in that said starting element is arranged on a drawer portion which projects from the housing when the drawer is in the first position.

23. A disc record player as claimed in claim 22, in which the drawer comprises a front wall, characterized in that the starting element can be actuated via at least a portion of the front wall of the drawer.

24. A disc record player as claimed in claim 21, in which the player comprises a disc pressure member for pressing the record disc onto the turntable in a press-down position which disc pressure member is secured to a pressure element which is movable between a press-down position and a position which is more remote from the turntable, characterized in that the supporting body is formed with at least one control groove in which a projection of the pressure element is slidable.

25. A disc-record player as claimed in claim 24, characterized in that the control groove comprises a groove portion which extends parallel to the supporting surface of the drawer and a groove portion which is downwardly inclined viewed in a direction related to the inward movement, the pressure element being moved to the press-down position during the inward movement of the drawer, and to said other position during the outward movement of the drawer.

* * * * *